(12) United States Patent
Spaulding et al.

(10) Patent No.: US 10,102,290 B2
(45) Date of Patent: Oct. 16, 2018

(54) METHODS FOR IDENTIFYING, RANKING, AND DISPLAYING SUBJECT MATTER EXPERTS ON SOCIAL NETWORKS

(71) Applicant: ORACLE INTERNATIONAL CORPORATION, Redwood Shores, CA (US)

(72) Inventors: Kent Spaulding, Portland, OR (US); Yasin Cengiz, Irvine, CA (US); Elizabeth Lingg, Pleasanton, CA (US); Tong Chen, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 581 days.

(21) Appl. No.: 14/656,053

(22) Filed: Mar. 12, 2015

(65) Prior Publication Data

US 2016/0267188 A1 Sep. 15, 2016

(51) Int. Cl.
*G06F 17/30* (2006.01)

(52) U.S. Cl.
CPC .... *G06F 17/30867* (2013.01); *G06F 17/3053* (2013.01); *G06F 17/30958* (2013.01)

(58) Field of Classification Search
CPC ........... G06F 17/30958; G06F 17/3053; G06F 17/30699
USPC ................................. 707/733, 734
See application file for complete search history.

(56) References Cited

U.S. PATENT DOCUMENTS

| | | | |
|---|---|---|---|
| 6,502,081 B1 * | 12/2002 | Wiltshire, Jr. .... | G06F 17/30707 706/12 |
| 7,143,091 B2 | 11/2006 | Charnock et al. | |
| 7,240,055 B2 * | 7/2007 | Grasso .............. | G06F 17/30867 |
| 7,827,125 B1 | 11/2010 | Rennison | |
| 2001/0044795 A1 * | 11/2001 | Cohen ................ | G06F 17/30699 |
| 2007/0294350 A1 * | 12/2007 | Kumar ................ | G06Q 10/10 709/205 |

(Continued)

FOREIGN PATENT DOCUMENTS

| | | |
|---|---|---|
| WO | 2011119864 A1 | 9/2011 |
| WO | 2014074607 A2 | 5/2014 |

OTHER PUBLICATIONS

Frequently Asked Questions—Sevendays, Retrieved from: https://www.sevendays.co/faq, 2013-2015, pp. 1-2.

(Continued)

*Primary Examiner* — Cheyne D Ly
(74) *Attorney, Agent, or Firm* — Kilpatrick Townsend and Stockton LLP

(57) ABSTRACT

Embodiments of the present invention allow a system to use data gathered from social networks and other systems to determine an ordered list of desired topics or skills to define a subject matter area and incorporate the order of the topics or skills into a search. To define this subject matter area, embodiments can consider not just the topics or skills that are listed, but those topics or skills that are similar based on a pre-computed topic graph. These considerations can be incorporated into a generated query, so that the query itself accounts for similarity of topics via the topic graph and the order of desired terms. The query generation process can include a claimed skills veracity model that provides differential weighting to claimed skills, based on the skill-sets of users who are deemed to be similar to the user being evaluated.

14 Claims, 9 Drawing Sheets

(56) References Cited

U.S. PATENT DOCUMENTS

| | | | |
|---|---|---|---|
| 2010/0228777 A1* | 9/2010 | Imig | G06F 17/30699 707/772 |
| 2011/0078188 A1* | 3/2011 | Li | G06Q 30/02 707/776 |
| 2013/0110567 A1 | 5/2013 | Omar | |
| 2013/0124268 A1* | 5/2013 | Hatton | G06Q 50/01 705/7.38 |
| 2014/0025441 A1* | 1/2014 | Eberlein | G06Q 10/06 705/7.39 |
| 2014/0214818 A1 | 7/2014 | Du et al. | |
| 2015/0120717 A1 | 4/2015 | Kim et al. | |
| 2015/0120782 A1 | 4/2015 | Kim et al. | |
| 2016/0117397 A1* | 4/2016 | Bansal | G06F 17/30867 707/723 |
| 2017/0011039 A1 | 1/2017 | Spaulding et al. | |

OTHER PUBLICATIONS

Neudesic Adds Innovative Skills, Expertise and Endorsement Capabilities to New Release of Social Business Software, Neudesic, http://www.prnewswire.com/news-releases/neudesic-adds-innovative-skills-expertise-and-endorsement-capabilities-to-new-release-of-social-business-software-211954401.html, Jun. 18, 2013, pp. 1-3.

U.S. Appl. No. 14/793,033, Non-Final Office Action dated Aug. 25, 2017, 16 pages.

Jive Software, Using Skills and Expertise, Retrieved from: https://docs.jivesoftware.com/jivecloud/community_user/index.jsp?topic=/com.jivesoftware.help.sbs.online/user/SkillsandExpertise.html, 1999-2014, 1 page.

Salesforce, Salesforce.com Spring'14 Release Notes, Skills-Pilot, SalesRelease Notes, Retrieved from: https://resources.docs.salesforce.com/188/latest/en-us/sfdc/pdf/salesforce_spring14_release_notes.pdf, Aug. 3, 2015, 357 pages.

Smith-Proulx, How LinkedIn Skills Endorsements Impact Your Job Search, ITT Tech-Official Site, Job-hunt, NET ability, Inc., Retrieved from: http://www.job-hunt.org/social-networking/LinkedIn-job-search/LinkedIn-skills-endorsements.shtml, 1998-2015, pp. 1-7.

U.S. Appl. No. 14/793,033, Corrected notice of Allowability dated May 16, 2018, 17 pages.

U.S. Appl. No. 14/793,033, Notice of Allowance dated Apr. 6, 2018, 19 pages.

\* cited by examiner

METHODS FOR IDENTIFYING, RANKING, AND DISPLAYING SUBJECT MATTER EXPERTS ON SOCIAL NETWORKS

BACKGROUND OF THE INVENTION

Embodiments of the present invention relate generally to methods and systems for performing a search and more particularly to defining a subject matter area for a set of desired skills and searching for a subject matter expert matching that subject matter area.

Data on social networks is about individuals and their connections and includes evidence, either direct or implied, about an individual proficiency in various topics. For example, a social network site may include a profile for a user that includes a list of skills, work history, various professional and/or personal endorsements, etc. Such information can be useful for a business or other entity to locate individuals with skills that are needed by that business. For example, a business or other entity can use such a pool of data about users, their skills, and their proficiency in each of those skills to find users who are potential experts in a given subject matter area for which they have a need. To do so, businesses generally use a simple search that takes a set of skills and finds users who possess at least one of those skills. Users who possess one or more skills are returned and then the result set is ranked. The more skills in that set that an individual possesses, the higher their rank and the earlier they appear in the results. Some systems may also base the ranking step on the proficiency in the skills that a user possesses. If two users possess the same proper subset of skills in, but one has higher proficiency, that user is ranked ahead of the other. However, such searches are limited in that they rely heavily on the identification of the skills used for the search which, if not properly defined, i.e., too broad, too narrow, incorrectly worded, etc., will cause the search to miss qualified candidates. Hence, there is a need for improved methods and systems for identifying, ranking, and displaying subject matter experts on social networks.

BRIEF SUMMARY OF THE INVENTION

Embodiments of the invention provide systems and methods for identifying, ranking, and displaying subject matter experts on social networks. According to one embodiment, identifying subject matter expertise based on a set of topics can comprise receiving an ordered list of topics. Each topic in the ordered list of topics can identify a particular skill or knowledge. Each topic in the ordered list of topics can be weighted based on an order of the topics in the ordered list of topics. For example, weighting each topic in the ordered list of topics can comprise weighting a first topic in the list of topics more heavily than a second topic in the list of topics. A subject matter area can be defined based on the ordered list of topics and one or more similar topics defined in a topic graph. For example, the topic graph can comprise a Directed Acyclic Graph (DAG), wherein nodes of the graph represent topics and a degree of similarity between those topics based on proximity of the nodes in the graph.

Defining the subject matter area based on the ordered list of topics can comprise comparing each topic from the ordered list of topics to the nodes of the graph. In response to finding a match between a topic from the ordered list of topics and a node of the graph, the topic indicated by the matching node of the graph can be added to the defined subject matter area. One or more similar topics indicated by the graph as related to the matching node of the graph can also be added to the defined subject matter area. Adding the topic indicated by the matching node of the graph to the defined subject matter area and adding one or more similar topics indicated by the graph as related to the matching node of the graph to the defined subject matter area can further comprise adding to the defined subject matter area an indication of a degree of similarity of each topic added to the subject matter area based on the graph.

A set of profiles of a plurality of individuals can be searched for one or more subject matter experts based on the defined subject matter area. The set of profiles can be generated based on information collected from one or more social network sites. Searching a set of profiles of a plurality of individuals for one or more subject matter experts based on the defined subject matter area can comprise generating a query based on the defined subject matter area. The query can comprise terms related to the topics of the subject matter area and boost values for the terms of the query based on the indication of the degree of similarity of the topics in the defined subject matter area. Generating the query based on the defined subject matter area can comprise adding to the query a term directed to a selected topic from the defined subject matter area, adding to the query as a logical OR condition of the query one or more terms directed to each similar topic to selected topic indicated by the defined subject matter area, and assigning the boost value for each term of the query. The generated query can be executed on the set of profiles and a list of results of said searching can be provided. The list of results can be order based on a degree of match between the defined subject matter area and the profiles for the one or more subject matter experts and the weighting of the topics. For example, results of executing the generated query can be ranked based on matches between the defined subject matter area and the set of profiles weighted by the boost values. In such cases, providing the list of results of said searching ordered based on a degree of match between the defined subject matter area and the profiles for the one or more subject matter experts and the weighting of the topics can be further based on said ranking.

DETAILED DESCRIPTION OF THE INVENTION

Figure 1:
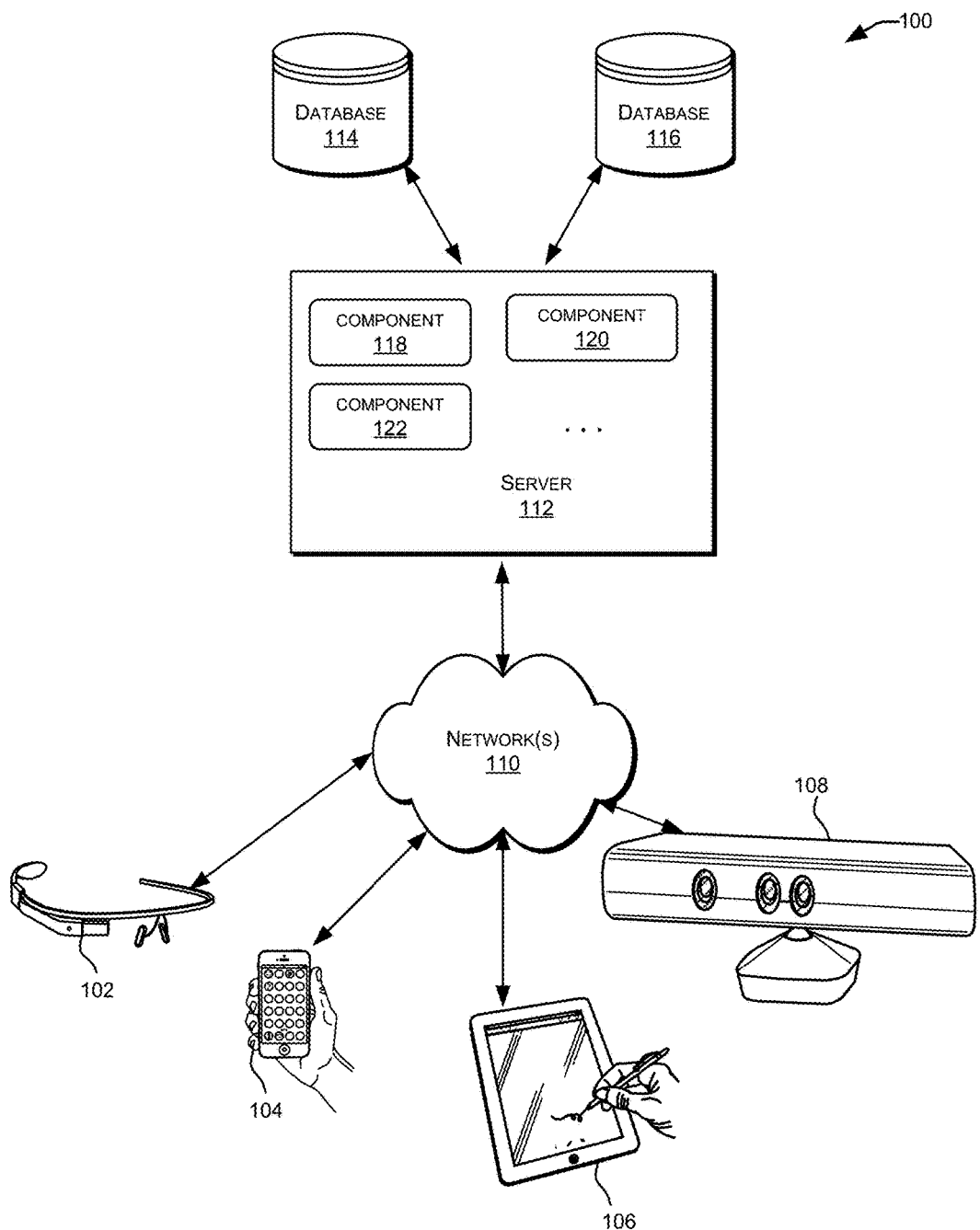
FIG. 1 is a block diagram illustrating components of an exemplary distributed system in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for identifying, ranking, and displaying subject matter experts on social networks. More specifically, embodiments of the present invention allow a system to use data gathered from social networks and Human Capital Management (HCM) systems to both determine the set of topics or skills in which a user has expertise. Embodiments can use an ordered list of desired topics or skills to define a subject matter area and incorporate the order of the topics or skills into the search/ranking. For example, an exponential decay function can be used to weight the listed topics or skills and define the precedence of terms in the search results. To define this subject matter area, embodiments can consider not just the topics or skills that are listed, but those topics or skills that are similar based on a pre-computed topic graph. For example, embodiments can traverse and index a topic graph, such as a Directed Acyclic Graph (DAG) representing a set of terms and a degree of similarity between those terms, to determine similarity in topics or skills. These considerations can be incorporated into a generated query, so that the query itself accounts for similarity of topics via the topic graph and the order of desired terms. Embodiments of the present invention need not take claimed skills at face value, but rather can use a model to assess the veracity of the claim which is expressed as a weight. For example, the query generation process can include a claimed skills veracity model that provides differential weighting to claimed skills, based on the skill-sets of users who are deemed to be similar to the user being evaluated. Various additional details of embodiments of the present invention will be described below with reference to the figures.

FIG. 1 is a block diagram illustrating components of an exemplary distributed system in which various embodiments of the present invention may be implemented. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices, running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Figure 2:
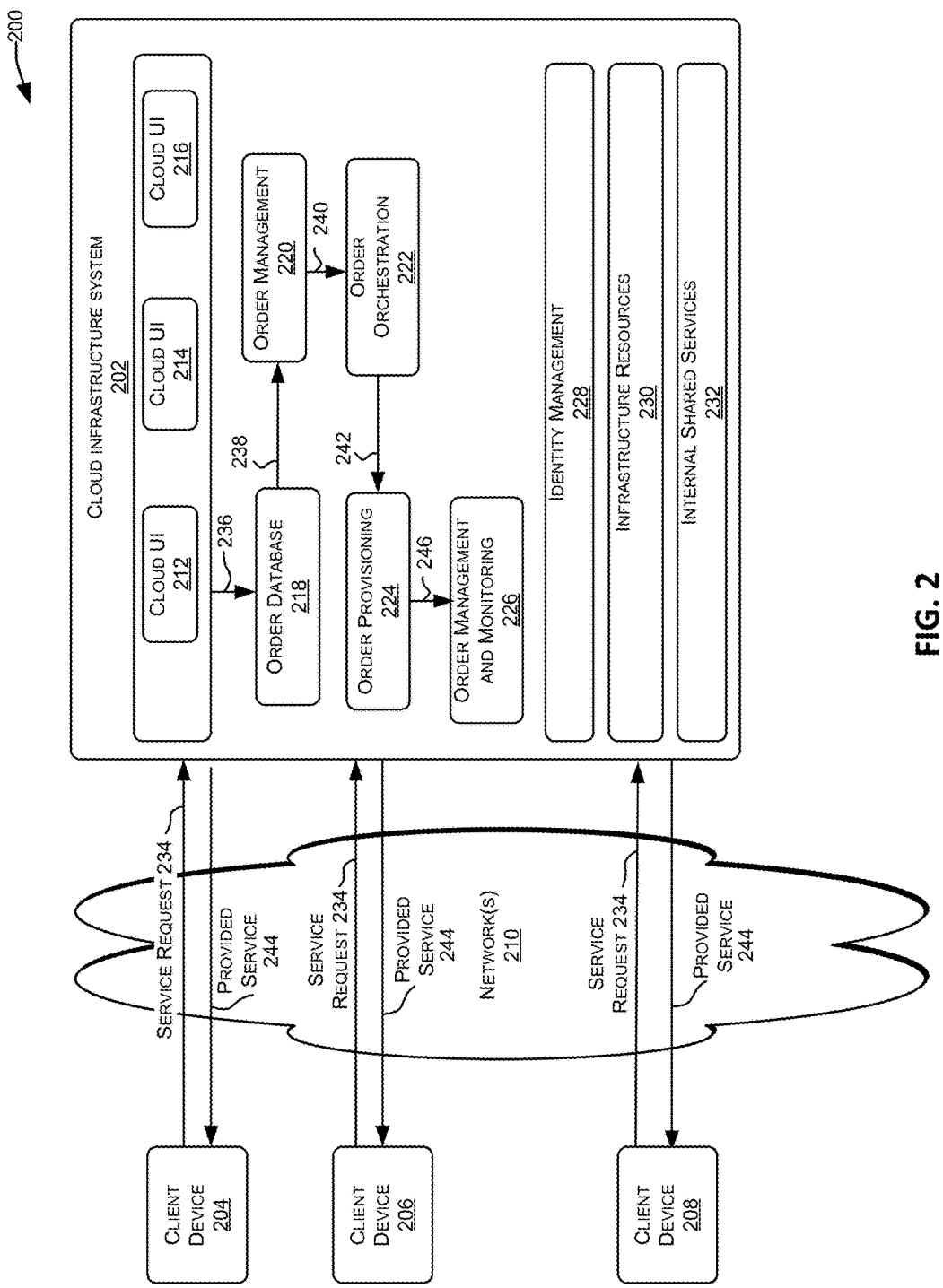
FIG. 2 is a block diagram illustrating components of a system environment by which services provided by embodiments of the present invention may be offered as cloud services.

FIG. 2 is a block diagram illustrating components of a system environment by which services provided by embodiments of the present invention may be offered as cloud services. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108.

Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110.

Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 230 for providing the resources used to provide various services to customers of the cloud infrastructure system. In one embodiment, infrastructure resources 230 may include pre-integrated and optimized combinations of hardware, such as servers, storage, and networking resources to execute the services provided by the PaaS platform and the SaaS platform.

In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like.

In one embodiment, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a customer using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the customer may access a cloud User Interface (UI), cloud UI 212, cloud UI 214 and/or cloud UI 216 and place a subscription order via these UIs. The order information received by cloud infrastructure system 202 in response to the customer placing an order may include information identifying the customer and one or more services offered by the cloud infrastructure system 202 that the customer intends to subscribe to.

After an order has been placed by the customer, the order information is received via the cloud UIs, 212, 214 and/or 216.

At operation 236, the order is stored in order database 218. Order database 218 can be one of several databases operated by cloud infrastructure system 218 and operated in conjunction with other system elements.

At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the customer. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the customer. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to customers on client devices 204, 206 and/or 208 by order provisioning module 224 of cloud infrastructure system 202.

At operation 246, the customer's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.)

Identity management module 228 may also include the management of descriptive information about each customer and about how and by whom that descriptive information can be accessed and modified.

Figure 3:
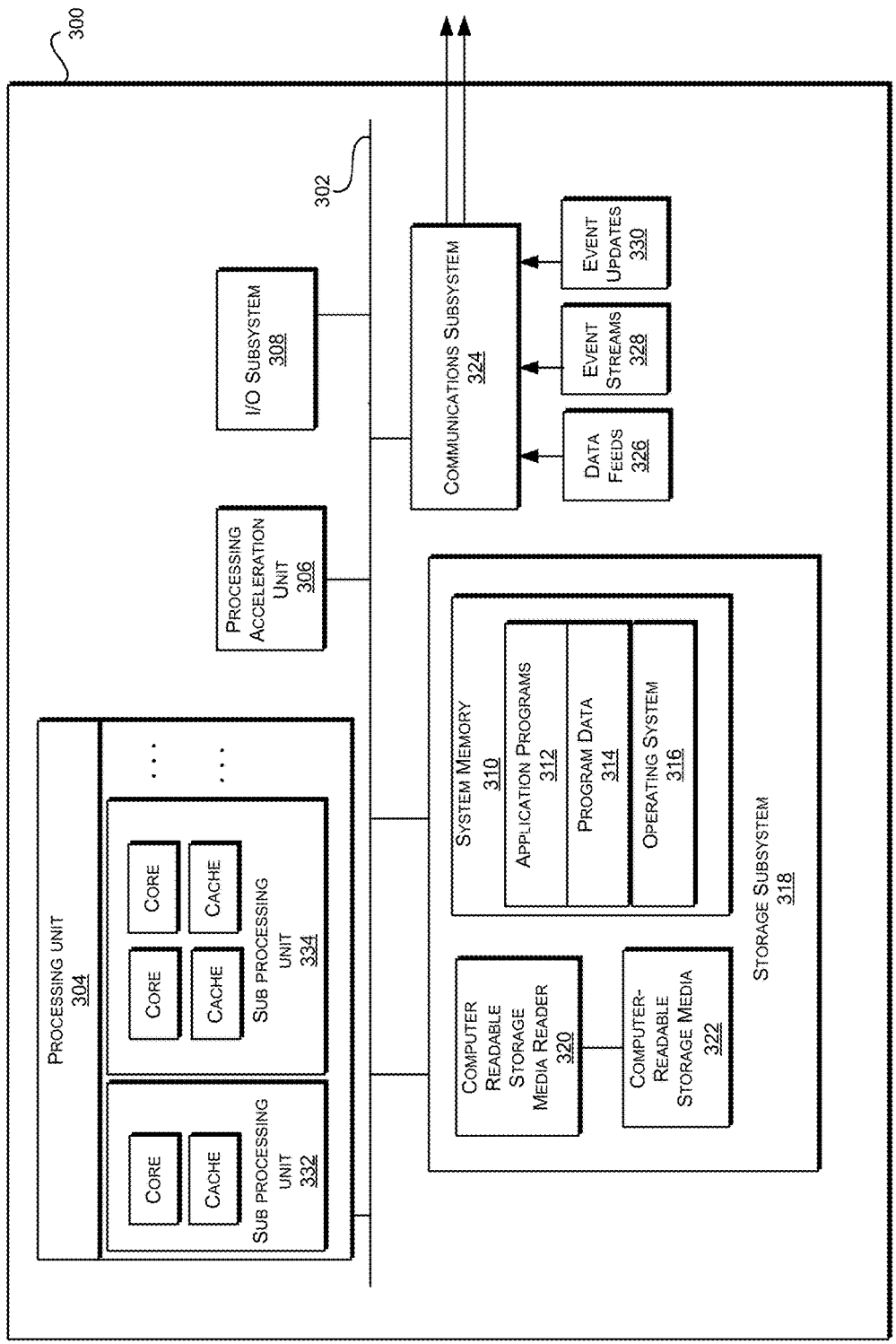
FIG. 3 is a block diagram illustrating an exemplary computer system in which embodiments of the present invention may be implemented.

FIG. 3 is a block diagram illustrating an exemplary computer system in which embodiments of the present invention may be implemented. The system 300 may be used to implement any of the computer systems described above. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as a blink detector that detects eye activity (e.g., 'blinking' while taking pictures and/or making a menu selection) from users and transforms the eye gestures as input into an input device. Additionally, user interface input devices may include voice recognition sensing devices that enable users to interact with voice recognition systems (e.g., Ski® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs.

Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300.

By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a head mounted display), a PC, a workstation, a mainframe, a kiosk, a server rack, or any other data processing system.

Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Figure 4:
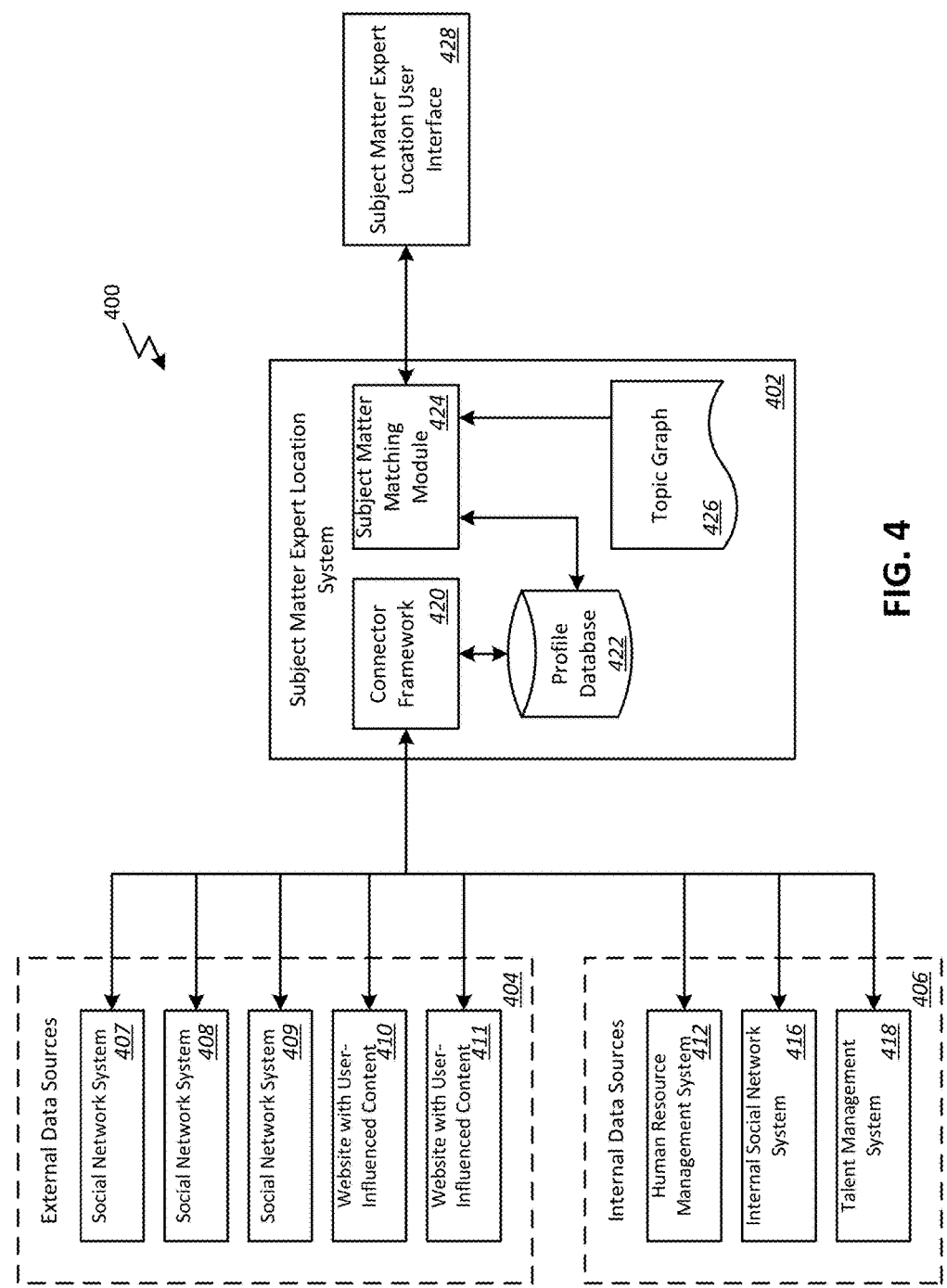
FIG. 4 is a block diagram illustrating, at a high-level, functional components of a system for identifying, ranking, and displaying subject matter experts on social networks according to one embodiment of the present invention.

FIG. 4 is a block diagram illustrating, at a high-level, functional components of a system for identifying, ranking, and displaying subject matter experts on social networks according to one embodiment of the present invention. In this example, the environment 400 includes a subject matter expert location system 402. The subject matter expert location system 402 may be one or more computer systems as described above collectively configured to operate in accordance with various embodiments of the present disclosure, such as those embodiments discussed below. In the illustrative example of FIG. 4, the subject matter expert location system 402 is configured to obtain data from external data sources 404 and internal data sources 406.

The subject matter expert location system 402 may be operated by an organization or on behalf of the organization. As such, external data sources 404 may be computer systems serving as a source of data where the computer systems are operated by and/or on behalf of entities different from the organization. Similarly, internal data sources 406 may be computer systems serving as sources of data where the computer systems are operated by and/or on behalf of the organization. It should be noted that the various data sources, internal and external, may be hosted in various ways. For example, one or more of the internal data sources may be hosted by the organization itself, such as in a data center or other facility of the organization. One or more of the internal data sources may be hosted by third parties. For example, one or more of the internal data sources may operate using facilities and hardware of a third party, yet may be programmatically managed by or on behalf of the organization. The hosting of external data sources may also vary in these ways.

Turning to the external data sources, example data sources include social network systems 407-409. A social networking system may be a publicly accessible computer system having users from the general public. The term "computer system," unless otherwise contradicted explicitly or by context, is intended to encompass both single computer instances (e.g. a single server) and multiple computer system instances, such as a network of computer system instances that collectively operate to achieve a result. Further, a computer system may also encompass multiple computer system instances that span multiple geographic regions and/or data center facilities. Returning to an example social networking system 407-409, the users of the social networking system may have accounts and corresponding profiles with the social network systems 407-409 and may engage in social networking activities. Example social networking activities include communicating electronically with other users of a social network system, either privately or publicly, expressing interest in content, and/or associating profiles with other profiles of the social network system which may be pursuant to mutual acceptance of the association by corresponding users. Specific examples of social networking systems include Facebook®, Twitter®, MySpace®, and others. Some specific examples of social networking activities in the Facebook social network system include friending other users, posting content on another's wall, liking content and/or other users, public or private messaging, un-friending other users, sharing content, and other activities. Example activities in the Twitter social network system include following other users, being followed by other users, tweeting, re-tweeting, and the like.

Generally, any suitable external data source may be used in accordance with various embodiments of the present disclosure. For example, various websites 410-411 with user-influenced content may serve as external data sources for the subject matter expert location system 402. A website with user-influenced content may be any public information resource in which content is associated with users of the website. Another example of a suitable website is an electronic profile in which a user is able to electronically provide a resume or history including or along with a list of topics or skills in which that user claims some experience and/or proficiency.

As with external data sources 404, internal data sources 406 may comprise one or more computer systems serving as an internal source of data for the subject matter expert location system 402. Typically, organizations utilize various computer systems in connection with management of their operations. An organization, for example, may utilize various computer systems for accounting, human resources, talent management, customer relationship management, internal social networking, internal information sources (e.g. internal websites), and the like. FIG. 4 shows some illustrative examples of suitable internal data sources 406 in accordance with an embodiment. For example, the internal data sources 406 include a human resource management system 412 which may be a computer system configured to perform various operations in connection with management of an organization's human resource needs.

The human resource management 412 may, for example, maintain data about employees of the organization and may allow administrators to update, add, and/or remove data for employees of the organization as the set of employees of the organization changes over time. The internal data sources 406 may also include an internal social network system 416. The internal social network system 416 may not be publicly accessible. That is, the universe of users of the internal social network system 416 may be limited, such as to employees of the organization, certain employees of the organization and/or individuals and/or computer systems to which the organization has provided authorization. As an example, the internal social network system 416 may be accessible to employees of the organization and certain vendors of the organization such as attorneys working in law firms for the organization. It should be noted and understood that, while referred to here as an "internal" social network system, this system may or may not be hosted internally. That is, it may actually be a hosted outside the company, but have a limited universe of employees, i.e., accessible by internal people. The internal data sources 406 may additionally or alternatively include a talent management system 418. The talent management system 418 may be a computer system configured to enable employees of the organization to perform various operations in connection with ensuring that the organization has appropriate personnel. For example, an employee of the organization may utilize the talent management system to track individuals who are engaged in the hiring process of the organization and/or to locate candidates for open positions. The talent management system may maintain resumes, may perform automated processing of received resumes, and the like. It should be noted and understood that this system might be hosted elsewhere, but would considered "internal" in the sense that only "internal" people have access to this system.

Turning to the subject matter expert location system 402, in an embodiment, the system includes multiple components. For example, the subject matter expert location system 402 can include a connecter framework 420. The connector framework 420 of the subject matter expert location system 402 may be a component (e.g. separate computer system instance(s) or programming module) configured to enable the subject matter expert location system 402 to obtain data from the external data sources 404 and internal data sources 406. The connector framework 420 may, for example, operate according to programming logic that enables the connector framework 420 to obtain data from numerous different data sources and combine the data in a manner suitable for processing by the subject matter expert location system 402 such as described below.

For example, many of the external data sources 404 and/or internal data sources 406 may provide data that is organized in different ways. The connector framework 420 may include programming logic to extract data and store data from multiple sources in a common manner such as in accordance with a common data storage schema. The connector framework 420 may obtain data from the various data sources in numerous ways. For example, in an embodiment, the connector framework 420 can be configured to obtain data from the various data sources according to application programming interfaces (APIs) of the various systems. For example, a social network system 407-409 may include an API for obtaining data available in the API. The connector framework 420 may include programming logic for making API calls in a manner acceptable to the social network system 407-409. Different social network systems may have different APIs and the connecter framework 420 may be configured appropriately to obtain data from the different sources.

The connector framework 420 may also be configured to obtain data in other ways. For example, data posted on web pages may be obtained by downloading web pages or other documents of the data source. For instance, a website may correspond to a domain name. The connector framework 420 may enable the subject matter expert location system 402 to obtain a web page or other document by using the URL. The connector framework 420 may analyze and receive documents and store data accordingly. The connector framework 420 may also utilize various screen scraping techniques and generally any technique in which data from a data source may be obtained.

As noted above, the connector framework 420 in an embodiment enables the subject matter expert location system 402 to obtain data from various different sources and store the data according to a common schema or generally in a manner suitable for use by the subject matter expert location system 402. In one embodiment, the data received through the connector framework 420 can be stored by the subject matter expert location system 402 into a profile database 422. The profile database 422 may be any data storage mechanism that enables the subject matter expert location system 402 to operate in accordance with the various embodiments described herein.

The profile database 422 may, for example, be a relational database comprising a computer system that utilizes storage to store data in multiple tables, where the tables associate some of the data with other data. For example a table may associate an identifier of an employee or other individual with skills data collected about the employee, such as data regarding the employee's work history, profile information, etc. collected from the various external data sources 404 and internal data sources 406.

According to one embodiment, the subject matter location system 402 can include a subject matter matching module 424 that can use data gathered from the various external data sources 404 and internal data sources 406 to determine the set of topics or skills in which a user has expertise. More specifically, the subject matter matching module 424 can receive an ordered list of desired topics or skills through a user interface 428 such as a web page or other graphical or non-graphical interface. Through such an interface 428, a recruiter, manager, or other user can define a set of topics or skills that are desired for a particular job opening, job assignment, project, or other need. This list of topics can be ordered by priority, i.e., most important or most desired first and in descending order of priority. For example, an exponential decay function can be used to weight the listed topics or skills and define the precedence of terms in the search results.

The subject matter matching module 424 can then use this ordered and weighted list to define a subject matter area that outlines or defines terms of topics to be searched. To define this subject matter area, the subject matter matching module 424 can consider not just the topics or skills that are listed and provided through the user interface 428, but those topics or skills that are similar based on a pre-computed topic graph 426. The topic graph 426 can represent a set of terms and a degree of similarity between those terms. For example, such as a topic graph 426 can comprise a Directed Acyclic Graph (DAG). An example of such a topic graph will be described further below with reference to FIG. 5.

To determine similarity in topics or skills, the subject matter matching module 424 can traverse the topic graph 426 to identify topics similar to those in the ordered list provided through the user interface. These similar topics can then be incorporated, along with the topics from the provided ordered list, into a query generated by the subject matter matching module 424. The subject matter matching module 424 can also wait these added similar terms based on a degree of similarity as represented in the topic graph 426. In this way, the query itself accounts for similarity of topics via the topic graph and the order of desired topics. Once generated, the query can be used by the subject matter matching module 424 to search the profile database 422 for those individuals having profile information matching the desired topics or with profile information that is similar to the desired topics. Once these individuals are identified by the subject matter matching module 424, a list of the individuals and perhaps some or all information from their profiles can be provided through the user interface 428. Regardless of the exact content presented, an indication of each located individual or potential subject matter expert can be presented in an order based on the degree of match to the provided list of topics and with consideration of the similar terms determined from the topic graph 426.

For example, topics can have synonyms which can be alternate spellings or true synonyms. "Java" can be a synonym of "java" and/or "JAVA." "Java Collections" can be a synonym of "Java Collections Framework." Similarly, "Software Engineering" can be a synonym of "SW Engineering." Embodiments can define the first item in the synonym chain as the canonical name (Java in the first example). Topics with the same canonical name can be considered to be the same topic. Topics can be represented and related to one another in a hierarchy of the topic graph as categories and topics. This graph can be pre-computed, directed, acyclic, and use only canonical names. The topics graph can be used to determine similarity which can be represented as a score, e.g., from 0 to 1, based on how close the topics are to one another in the graph. For example, siblings can be considered similar while the children of siblings can be considered less similar than the siblings, and so on.

Embodiments of the present invention ask a user to define a subject matter by selecting and ordering a set of topics with the first being more important than that last. A subject matter area can be expressed as an ordered set of topics. To find the subject matter experts for a given subject matter area, embodiments generate queries against an index of the profile information that uses canonical names of skills. The generated query can use the canonical topics names and a boost value based on its position in the ordered set of topics representing the subject matter area. For example, an exponential decay function can be used to define these boost values. Each topic can be expanded into a logical "or" expression that includes boost values based on similarity scores. In other words, similarity can be incorporated into the query as illustrated in the following pseudo-code example: given Java similar-to(0.9) C# and Java similar-to (0.7) C++, and search for "Java" can be expanded to ("Java" OR "C#"^0.9 OR "C++"^0.7). It should be understood that this pseudo-code example can be implemented in any number of search engine query languages that support boosting of terms. In some cases, similar terms are included only when they are above a certain similarity threshold which is configurable.

Stated another way, identifying subject matter expertise based on a set of topics can comprise receiving by the subject matter matching module 424 an ordered list of topics through the user interface 428. Each topic in the ordered list of topics can identify a particular skill or knowledge desired for a particular subject matter expert being sought. Each topic in the ordered list of topics can be weighted by the subject matter matching module 424 based on an order of the topics in the ordered list of topics. For example, weighting each topic in the ordered list of topics can comprise weighting the topics based on a decay function, i.e., a first topic in the list of topics more heavily than a second topic in the list of topics. Similarly, subsequent topics in the list can be assigned decreasing weights. Additionally or alternatively, weights may be assigned based on other criteria or conditions such as user selections or configurations, user defined or predefined rules or policies, etc.

A subject matter area can then be defined by the subject matter matching module 424 based on the ordered list of topics and the topic graph 426. The nodes of the graph can represent topics. A degree of similarity between those topics can be represented by or based on proximity of the nodes in the graph. More specifically, defining a subject matter area can comprise the subject matter matching module 424 comparing each topic from the ordered list of topics to the nodes of the graph, e.g., by traversing the graph or by other methods. In response to finding a match between a topic from the ordered list of topics and a node of the graph 426, the topic indicated by the matching node of the graph 426 can be added by the subject matter matching module 424 to the defined subject matter area. One or more similar topics indicated by the graph 426 as related to the matching node, e.g., sibling nodes or other nearby nodes, can also be added by the subject matter matching module 424 to the defined subject matter area. According to one embodiment, the subject matter matching module 424 can also add an indication of a degree of similarity of each topic added to the subject matter area based on the graph 426. In other words, the similar topics, i.e., nearby nodes, can be weighted by the subject matter matching module 424 to indicate similarity based on nearness in the graph 426.

Once the subject matter area has been defined by the subject matter matching module 424, the profiles 422 of a plurality of individuals can be searched by the subject matter matching module 424 for one or more subject matter experts based on the defined subject matter area. As noted above, the set of profiles can be generated based on information collected from one or more social network sites, i.e., internal data sources 406 and/or external data sources 404. More specifically, searching the profiles 422 can comprise the subject matter matching module 424 generating a query based on the defined subject matter area. The subject matter matching module 424 can generate the query by adding to the query a term directed to a selected topic from the defined subject matter area. One or more terms directed to each similar topic to selected topic indicated by the defined subject matter area can also be added to the query by the subject matter matching module 424 as a logical OR condition of the query. The boost value can also be assigned by the subject matter matching module 424 for each term of the query. A determination can then be made by the subject matter matching module 424 as to whether other topics from the defined subject matter area remain to be added to the query. In response to determining that other topics from the defined subject matter area remain to be added to the query, the subject matter matching module 424 can continue adding topics to the query and assigning boost values for those topics until all topics of the defined subject matter area have been added to the query.

Once generated, the query can be executed by the subject matter matching module 424 on the set of profiles 422 and results can be ranked by the subject matter matching module 424 based on matches between the defined subject matter area and the set of profiles 422 weighted by the boost values. A list of results of the search can be provided by the subject matter matching module 424, for example through the user interface 428, the list of results can be ordered based on a degree of match between the defined subject matter area and the profiles 422 for the one or more subject matter experts and the weighting of the topics.

In use, embodiments of the present invention may be particularly useful when looking for a very specific skill set for a specific location and position. One example would be a very technical VP who is willing to work hard and has a unique technical skill. Another case where embodiments of the present invention may be especially helpful include internal hiring where there is a need for an existing employee for a short term project or an internal candidate who is willing to travel or willing to move to a new location. In yet another example, such as seasonal hiring where a large number of employees are hired in a relatively short time, embodiments of the present invention can be used to quickly review candidates based on specific skills such as proficiency with particular Point of Sale equipment or software.

Figure 5:
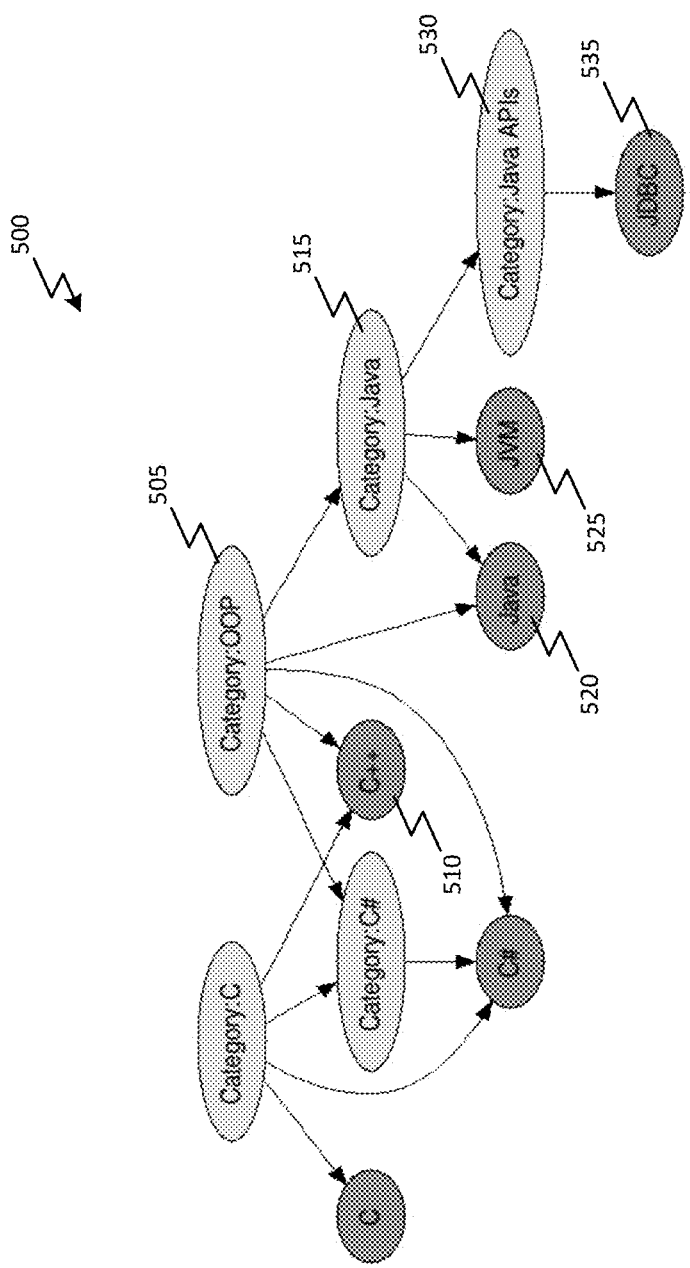
FIG. 5 illustrates an exemplary topic graph for defining subject matter areas according to one embodiment of the present invention.

FIG. 5 illustrates an exemplary topic graph for defining subject matter areas according to one embodiment of the present invention. As illustrated here, terms can be represented and related to one another in a hierarchy of the topic graph 500. The nodes 505-535 of the graph can represent categories 505, 515, and 530 and topics 510, 520, 525, and 535. This graph 500 can comprise a Directed Acyclic Graph (DAG) and can be pre-computed, directed, acyclic, and use only canonical names. A degree of similarity between the categories topics can be represented by or based on proximity of the nodes 505-535 in the graph. The topics graph 500 can be used to determine similarity which can be represented as a score, e.g., from 0 to 1, based on how close the topics are to one another in the graph. For example, siblings such topic Java 520 and topic JVM 525 can be considered similar while the children of siblings such as topic JDBC 535 can be considered less similar than the siblings, and so on.

Figure 6:
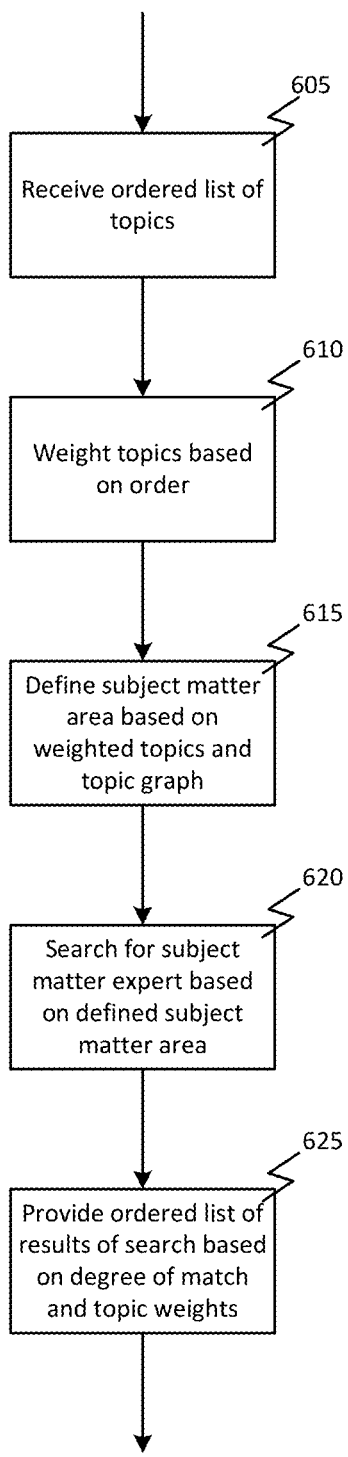
FIG. 6 is a flowchart illustrating a process for identifying, ranking, and displaying subject matter experts on social networks according to one embodiment of the present invention.

FIG. 6 is a flowchart illustrating a process for identifying, ranking, and displaying subject matter experts on social networks according to one embodiment of the present invention. As illustrated in this example, identifying subject matter expertise based on a set of topics can comprise receiving 605 an ordered list of topics. Each topic in the ordered list of topics can identify a particular skill or knowledge. For example, these topics can be selected or defined through a user interface as described above and can reflect the set of skills and/or knowledge desired for a particular subject matter expert being sought.

Each topic in the ordered list of topics can be weighted 610 based on an order of the topics in the ordered list of topics. For example, weighting 610 each topic in the ordered list of topics comprises weighting a first topic in the list of topics more heavily than a second topic in the list of topics. Similarly, subsequent topics in the list can be assigned decreasing weights. Alternatively, weights may be assigned based on other criteria or conditions such as user selections or configurations, user defined or predefined rules or policies, etc.

A subject matter area can be defined 615 based on the ordered list of topics and a topic graph. For example and as described above with reference to FIG. 5, the topic graph can comprise a Directed Acyclic Graph (DAG). In such a case, the nodes of the graph can represent topics. A degree of similarity between those topics can be represented by or based on proximity of the nodes in the graph. That is, sibling nodes can be considered to represent similar topics with the closest siblings representing the nearest matches. Additional details of an exemplary process for defining a subject matter area will be described below with reference to FIG. 7.

A set of profiles of a plurality of individuals can be searched 620 for one or more subject matter experts based on the defined subject matter area. As noted above, the set of profiles can be generated based on information collected from one or more social network sites, i.e., internal and/or external data sources as described above with reference to FIG. 4. Additional details of an exemplary process for searching a set of profiles will be described below with reference to FIG. 8. A list of results of the search can be provided 625 where the list of results can be ordered based on a degree of match between the defined subject matter area and the profiles for the one or more subject matter experts and the weighting of the topics.

Figure 7:
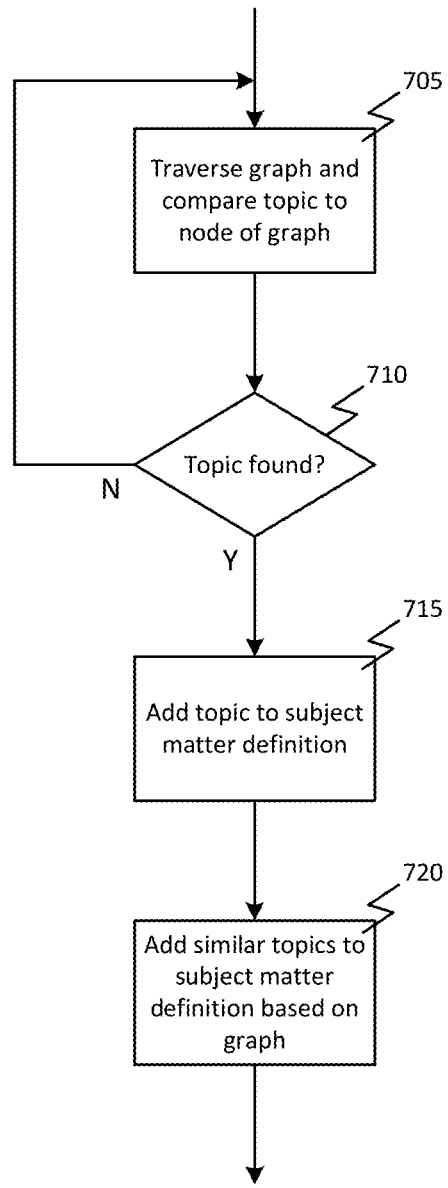
FIG. 7 is a flowchart illustrating a process for defining a subject matter area according to one embodiment of the present invention.

FIG. 7 is a flowchart illustrating a process for defining a subject matter area according to one embodiment of the present invention. As illustrated in this example, defining 615 the subject matter area based on the ordered list of topics can comprise comparing 705 each topic from the ordered list of topics to the nodes of the graph, e.g., by traversing the graph or by other methods. In response to finding 710 a match between a topic from the ordered list of topics and a node of the graph, the topic indicated by the matching node of the graph can be added 715 to the defined subject matter area. One or more similar topics indicated by the graph as related to the matching node of the graph, e.g., sibling nodes or other nearby nodes, can also be added 720 to the defined subject matter area. According to one embodiment, adding 715 the topic indicated by the matching node of the graph to the defined subject matter area and adding 720 one or more similar topics indicated by the graph as related to the matching node of the graph to the defined subject matter area can further comprise adding to the defined subject matter area an indication of a degree of similarity of each topic added to the subject matter area based on the graph. In other words, the similar topics, i.e., nearby nodes, can be weighted to indicate similarity based on nearness in the graph.

Figure 8:
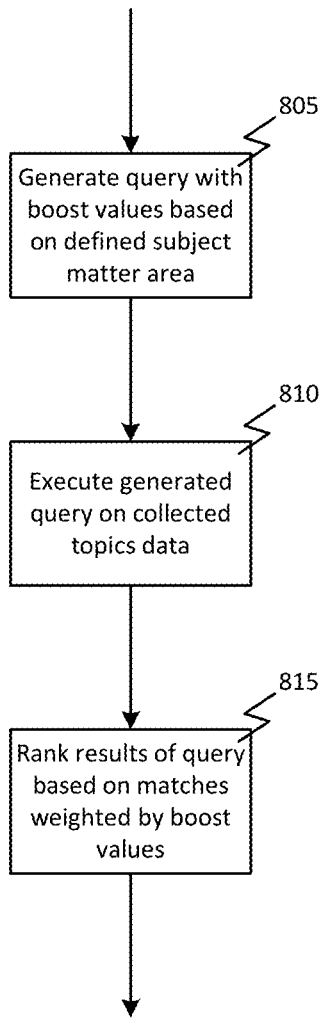
FIG. 8 is a flowchart illustrating a process for searching a set of profiles for subject matter experts according to one embodiment of the present invention.

FIG. 8 is a flowchart illustrating a process for searching a set of profiles for subject matter experts according to one embodiment of the present invention. As illustrated in this example, searching 620 a set of profiles of a plurality of individuals for one or more subject matter experts based on the defined subject matter area can comprise generating 805 a query based on the defined subject matter area. Additional details of an exemplary process for generating 805 a query will be described below with reference to FIG. 9. However generally speaking, the query can comprise terms related to the topics of the subject matter area and boost values for the terms of the query based on the indication of the degree of similarity of the topics in the defined subject matter area. In other words, the boost values can be the weighting applied to the topics to reflect the similarity of the terms or can be based on that weighing. The generated query can be executed 810 on the set of profiles and results of executing 810 the generated query can be ranked 815 based on matches between the defined subject matter area and the set of profiles weighted by the boost values. Providing 625 the list of results of said searching ordered based on a degree of match between the defined subject matter area and the profiles for the one or more subject matter experts and the weighting of the topics can be further based on said ranking.

Figure 9:
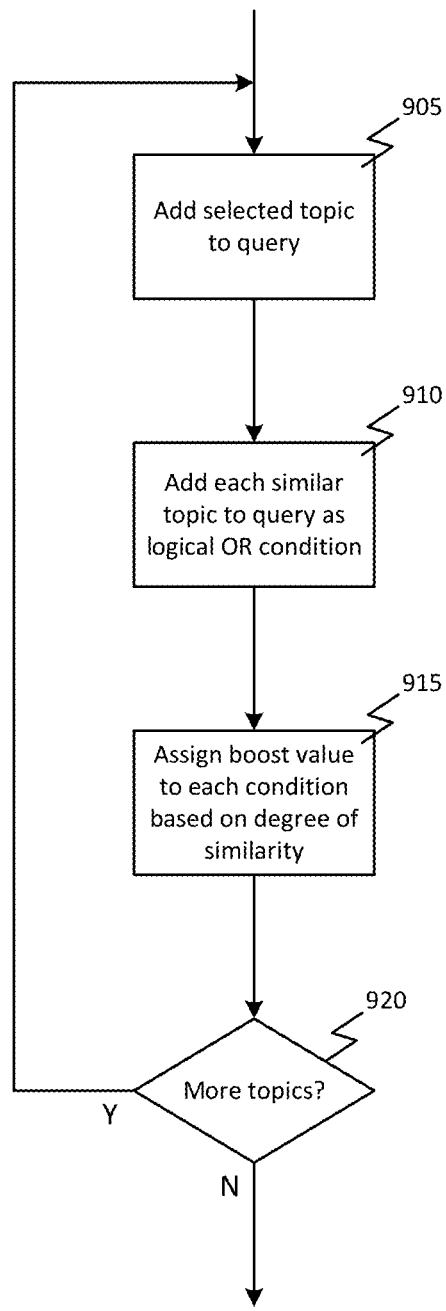
FIG. 9 is a flowchart illustrating a process for generating a query based on a defined subject matter area according to one embodiment of the present invention.

FIG. 9 is a flowchart illustrating a process for generating a query based on a defined subject matter area according to one embodiment of the present invention. As illustrated in this example, generating 805 the query based on the defined subject matter area can comprise adding 905 to the query a term directed to a selected topic from the defined subject matter area. One or more terms directed to each similar topic to selected topic indicated by the defined subject matter area can also be added 910 to the query as a logical OR condition of the query. The boost value can be assigned 915 for each term of the query. A determination 920 can then be made as to whether other topics from the defined subject matter area remain to be added to the query. In response to determining 920 that other topics from the defined subject matter area remain to be added to the query, processing can continue with adding 905 and 910 topics to the query and assigning 915 boost values for those topics until 920 all topics of the defined subject matter area have been added to the query.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for identifying subject matter expertise based on a set of topics, the method comprising:
   receiving an ordered list of topics, each topic in the ordered list of topics identifying a particular skill or knowledge;
   weighting each topic in the ordered list of topics based on an order of the topics in the ordered list of topics;

for the received ordered list of topics, defining a subject matter area based on the ordered list of topics and topics defined in a graph, the graph comprising a Directed Acyclic Graph (DAG) with nodes representing the topics defined by the graph, wherein a distance between two nodes of the graph represents a degree of similarity between the topics represented by those two nodes, wherein the defining comprises:
  comparing each topic from the ordered list of topics to the nodes of the graph; and
  in response to finding a match between a topic from the ordered list of topics and a topic represented by a node of the graph:
    adding the topic represented by the matching node of the graph to the defined subject matter area;
    determining one or more nearby nodes to the matching node in the graph, each of the one or more nearby nodes having a distance to the matching node that is within a distance threshold; and
    adding one or more similar topics represented by the one or more nearby nodes to the defined subject matter area;
searching a set of profiles of a plurality of individuals to identify one or more subject matter experts from the plurality of individuals by:
  generating a query by adding, to the query, a set of terms separated by logical operators, the set of terms directed to the one or more topics added to the defined subject matter area;
  executing the query against the set of profiles of the plurality of individuals; and
providing a list of results of said searching, the list of results ordered based on a degree of match between the defined subject matter area and the profiles for the one or more subject matter experts and the weighting of the topics.

2. The method of claim 1, wherein weighting each topic in the ordered list of topics comprises assigning a first weight to a first topic in the list of topics and assigning a second weight to a second topic in the list of topics, wherein the first weight is greater than the second weight.

3. The method of claim 1, wherein the set of profiles are generated based on information collected from one or more social network sites.

4. The method of claim 1, wherein adding one or more similar topics represented by the one or more nearby nodes to the defined subject matter area further comprises adding to the defined subject matter area an indication of a degree of similarity of the one or more similar topics to the topic indicated by the matching node.

5. The method of claim 4, wherein searching a set of profiles of a plurality of individuals for one or more subject matter experts based on the defined subject matter area further comprises:
  generating a query based on the defined subject matter area, the query comprising terms related to the topics of the subject matter area and boost values for the terms of the query based on the indication of the degree of similarity of the topics in the defined subject matter area;
  executing the generated query on the set of profiles; and
  ranking results of executing the generated query based on matches between the defined subject matter area and the set of profiles weighted by the boost values, wherein providing the list of results of said searching ordered based on a degree of match between the defined subject matter area and the profiles for the one or more subject matter experts and the weighting of the topics is further based on said ranking.

6. The method of claim 5, wherein generating the query based on the defined subject matter area comprises:
  adding to the query a term directed to a selected topic from the defined subject matter area;
  adding to the query as a logical OR condition of the query one or more terms directed to each similar topic to selected topic indicated by the defined subject matter area; and
  assigning the boost value for each term of the query.

7. A system comprising:
a processor; and
a memory coupled with and readable by the processor and storing therein a set of instructions which, when executed by the processor, causes the processor to identify subject matter expertise based on a set of topics by:
  receiving an ordered list of topics, each topic in the ordered list of topics identifying a particular skill or knowledge;
  weighting each topic in the ordered list of topics based on an order of the topics in the ordered list of topics;
  for the received ordered listed of topics, defining a subject matter area based on the ordered list of topics and topics defined in a graph, the graph comprising a Directed Acyclic Graph (DAG) with nodes representing the topics defined by the graph, wherein a distance between two nodes of the graph represents a degree of similarity between the topics represented by those two nodes, and wherein the defining comprises:
    comparing each topic from the ordered list of topics to the nodes of the graph; and
    in response to finding a match between a topic from the ordered list of topics and a topic represented by a node of the graph:
      adding the topic represented by the matching node of the graph to the defined subject matter area;
      determining one or more nearby nodes to the matching node in the graph, each of the one or more nearby nodes having a distance to the matching node that is within a distance threshold; and
      adding one or more similar topics represented by the one or more nearby nodes to the defined subject matter area;
  searching a set of profiles of a plurality of individuals to identify one or more subject matter experts from the plurality of individuals by:
    generating a query by adding, to the query, a set of terms separated by logical operators, the set of terms directed to the one or more topics added to the defined subject matter area;
    executing the query against the set of profiles of the plurality of individuals; and
  providing a list of results of said searching, the list of results ordered based on a degree of match between the defined subject matter area and the profiles for the one or more subject matter experts and the weighting of the topics.

8. The system of claim 7, wherein adding one or more similar topics represented by the one or more nearby nodes to the defined subject matter area further comprises adding to the defined subject matter area an indication of a degree of similarity of the one or more similar topics to the topic indicated by the matching node.

9. The system of claim 8, wherein searching a set of profiles of a plurality of individuals for one or more subject matter experts based on the defined subject matter area further comprises:
generating a query based on the defined subject matter area, the query comprising terms related to the topics of the subject matter area and boost values for the terms of the query based on the indication of the degree of similarity of the topics in the defined subject matter area;
executing the generated query on the set of profiles; and
ranking results of executing the generated query based on matches between the defined subject matter area and the set of profiles weighted by the boost values, wherein providing the list of results of said searching ordered based on a degree of match between the defined subject matter area and the profiles for the one or more subject matter experts and the weighting of the topics is further based on said ranking.

10. The system of claim 9, wherein generating the query based on the defined subject matter area comprises:
adding to the query a term directed to a selected topic from the defined subject matter area;
adding to the query as a logical OR condition of the query one or more terms directed to each similar topic to selected topic indicated by the defined subject matter area; and
assigning the boost value for each term of the query.

11. A computer-readable memory comprising a set of instructions stored therein which, when executed by a processor, causes the processor to identify subject matter expertise based on a set of topics by:
receiving an ordered list of topics, each topic in the ordered list of topics identifying a particular skill or knowledge;
weighting each topic in the ordered list of topics based on an order of the topics in the ordered list of topics;
for the received ordered list of topics, defining a subject matter area based on the ordered list of topics and topics defined in a graph, the graph comprising a Directed Acyclic Graph (DAG) with nodes representing the topics defined by the graph, wherein a distance between two nodes of the graph represents a degree of similarity between the topics represented by those two nodes, wherein the defining comprises:
comparing each topic from the ordered list of topics to the nodes of the graph; and
in response to finding a match between a topic from the ordered list of topics and a topic represented by a node of the graph:
adding the topic represented by the matching node of the graph to the defined subject matter area;
determining one or more nearby nodes that each have a distance to the matching node that is within a distance threshold; and
adding one or more similar topics represented by the one or more nearby to the defined subject matter area;
searching a set of profiles of a plurality of individuals to identify one or more subject matter experts from the plurality of individuals by:
generating a query by adding, to the query, a set of terms separated by logical operators, the set of terms directed to the one or more topics added to the defined subject matter area;
executing the query against the set of profiles of the plurality of individuals; and
providing a list of results of said searching, the list of results ordered based on a degree of match between the defined subject matter area and the profiles for the one or more subject matter experts and the weighting of the topics.

12. The computer-readable memory of claim 11, wherein adding one or more similar topics to the defined subject matter area further comprises adding to the defined subject matter area an indication of a degree of similarity of the one or more similar topics to the topic indicated by the matching node.

13. The computer-readable memory of claim 12, wherein searching a set of profiles of a plurality of individuals for one or more subject matter experts based on the defined subject matter area further comprises:
generating a query based on the defined subject matter area, the query comprising terms related to the topics of the subject matter area and boost values for the terms of the query based on the indication of the degree of similarity of the topics in the defined subject matter area;
executing the generated query on the set of profiles; and
ranking results of executing the generated query based on matches between the defined subject matter area and the set of profiles weighted by the boost values, wherein providing the list of results of said searching ordered based on a degree of match between the defined subject matter area and the profiles for the one or more subject matter experts and the weighting of the topics is further based on said ranking.

14. The computer-readable memory of claim 13, wherein generating the query based on the defined subject matter area comprises:
adding to the query a term directed to a selected topic from the defined subject matter area;
adding to the query as a logical OR condition of the query one or more terms directed to each similar topic to selected topic indicated by the defined subject matter area; and
assigning the boost value for each term of the query.

* * * * *

UNITED STATES PATENT AND TRADEMARK OFFICE
CERTIFICATE OF CORRECTION

PATENT NO. : 10,102,290 B2
APPLICATION NO. : 14/656053
DATED : October 16, 2018
INVENTOR(S) : Spaulding et al.

Page 1 of 1

It is certified that error appears in the above-identified patent and that said Letters Patent is hereby corrected as shown below:

In the Specification

In Column 12, Line 8, delete "Ski®" and insert -- Siri® --, therefor.

Signed and Sealed this
Seventh Day of January, 2020

Andrei Iancu
*Director of the United States Patent and Trademark Office*